United States Patent [19]
Pollard

[11] 3,810,337
[45] May 14, 1974

[54] ELONGATED STRESSED STRUCTURAL MEMBER

[76] Inventor: Stephen LeRoy Pollard, 405 Holy Ave., Monrovia, Calif. 91016

[22] Filed: Oct. 28, 1970

[21] Appl. No.: 84,801

[52] U.S. Cl............... 52/223 R, 161/160, 161/161, 156/79, 156/161, 52/724, 52/731, 52/309, 264/45
[51] Int. Cl............................................. B32b 3/26
[58] Field of Search ............. 161/160, 161; 264/45; 52/309, 724, 223 R, 731; 156/160, 161, 163, 79

[56] References Cited
UNITED STATES PATENTS

| | | | |
|---|---|---|---|
| 3,411,967 | 11/1968 | Rowland et al. | 156/79 |
| 3,484,331 | 12/1969 | Betz | 161/161 |
| 2,959,508 | 11/1960 | Graham et al. | 161/161 |
| 3,410,044 | 11/1968 | Moog | 52/309 |
| 3,493,460 | 2/1970 | Windecker | 161/161 |
| 3,555,131 | 1/1971 | Weismann | 264/45 |
| 3,607,504 | 9/1971 | Howard | 156/155 |

*Primary Examiner*—William J. Van Balen
*Attorney, Agent, or Firm*—Joseph E. Mueth

[57] ABSTRACT

This patent describes a novel stressed structural member which comprises a composite of a lightweight void-containing core to which is bonded thin skin sheets on at least some of the lateral surfaces, said core having one or more reinforcing members embedded therein. This patent further describes a novel method of manufacturing a novel stressed structural member which comprises positioning thin skin sheets in a predetermined arrangement around one or more reinforcing members, forming a lightweight void-containing core around said reinforcing members which bonds to said members and said skin sheets, and applying stress to said composite. In a preferred embodiment of this invention, the novel stressed structural member comprises an elongated beam having four lateral sides and formed of a composite of a lightweight void-containing core to which is bonded on four sides thin skin sheets, said core having one or more reinforcing members embedded therein, and end cap members at each end of said beam.

4 Claims, 5 Drawing Figures

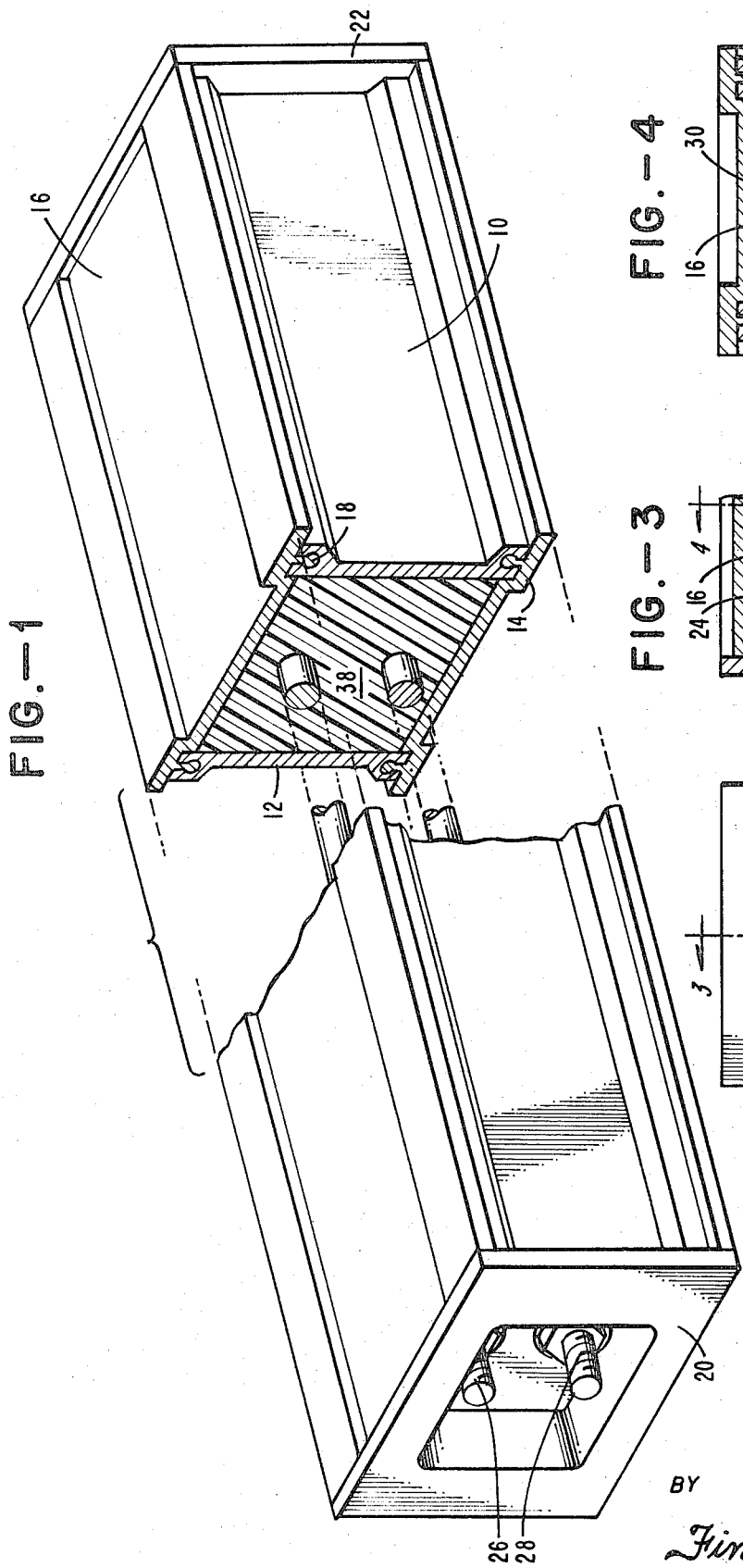
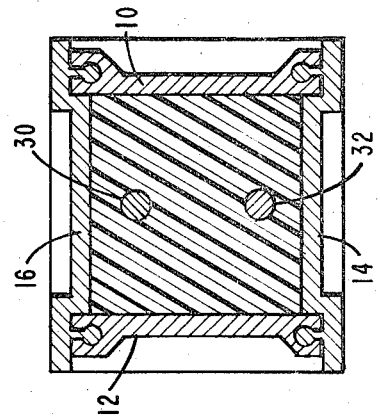
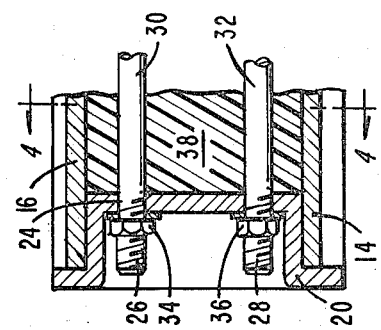
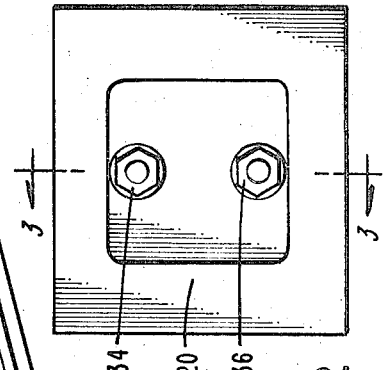

ELONGATED STRESSED STRUCTURAL MEMBER

BACKGROUND OF THE INVENTION

Plastic structural members are known. For example beams and panels having thin metal skin sheets and a foamed plastic core have been in use for some time. Composites of this type possess fairly good strength to weight ratios. However, for many uses, the existing materials are deficient in several respects. One problem arises from the fact that the existing techniques do not readily afford the fabrication of a structural member which can be specifically adapted to receive some predetermined load or stress distribution. In general, in known materials, the load bearing properties of the structural member is fixed at the time of manufacture and simply does not lend itself to subsequent modification or adjustment.

Prestressed concrete is well-known, and involves the expansion or stretching of reinforcing members while allowing the concrete to harden therearound, thus transmitting the contracting force of the reinforcing members to the hardened concrete. Prestressed concrete possesses compressive stress resistance which is substantially superior to that of ordinary concrete. However, because of the rigid nature of concrete, no adjustment in prestressing can be made after the hardening of the concrete.

The present invention, it is believed, represents a major advance in the art of lightweight composite structural members by providing for the first time, a lightweight void-containing core having thin skin sheets bonded thereto in which is embedded one or more reinforcing members, said reinforcing members and skin sheets can be used to apply compressive force to the core to adjust the stress or load bearing properties of the composite to meet the specific application intended.

SUMMARY OF THE INVENTION

Briefly, the present invention comprises a novel stressed structural member which comprises a composite of a lightweight void-containing core to which is bonded thin skin sheets on at least some of the lateral surfaces, said core having one or more reinforcing members embedded therein. This patent further describes a novel method of manufacturing a novel stressed structural member which comprises positioning thin skin sheets in a predetermined arrangement around one or more reinforcing members, forming a lightweight void-containing core around said reinforcing members which bonds to said members and said skin sheets, and applying stress to said composite. In a preferred embodiment of this invention, the novel stressed structural member comprises an elongated beam having four lateral sides and formed of a composite of a lightweight voidcontaining core to which is bonded on four sides thin skin sheets, said core having one or more reinforcing members embedded therein, and end cap members at each end of said beam.

It is an object of my invention to provide a novel structural member.

More specifically, it is an object of this invention to provide a novel structural member having reinforcing members therein which are adapted to prestress the member during or at a time subsequent to fabrication.

Another object of my invention is to provide a novel method of forming a stressed void-containing structural member.

It is a particular object of the present invention to provide novel stressed beam or panel structural member having reinforcing members embedded therein.

These and other objects and advantages of this invention will be apparent from the more detailed description which follows taken in conjunction with the accompanying drawings.

DESCRIPTION OF THE PREFERRED EMBODIMENTS

Turning to the drawings:

FIG. 1 is a perspective view of an embodiment of this invention in which the center portion has been removed to expose the interior in cross-section.

FIG. 2 is an end view of the embodiment of FIG. 1.

FIG. 3 is a partial section of the embodiment of FIG. 1 taken longitudinally with respect thereto and in proximity to one end thereof.

FIG. 4 is a sectional view of the embodiment of FIG. 1.

Figure 5:
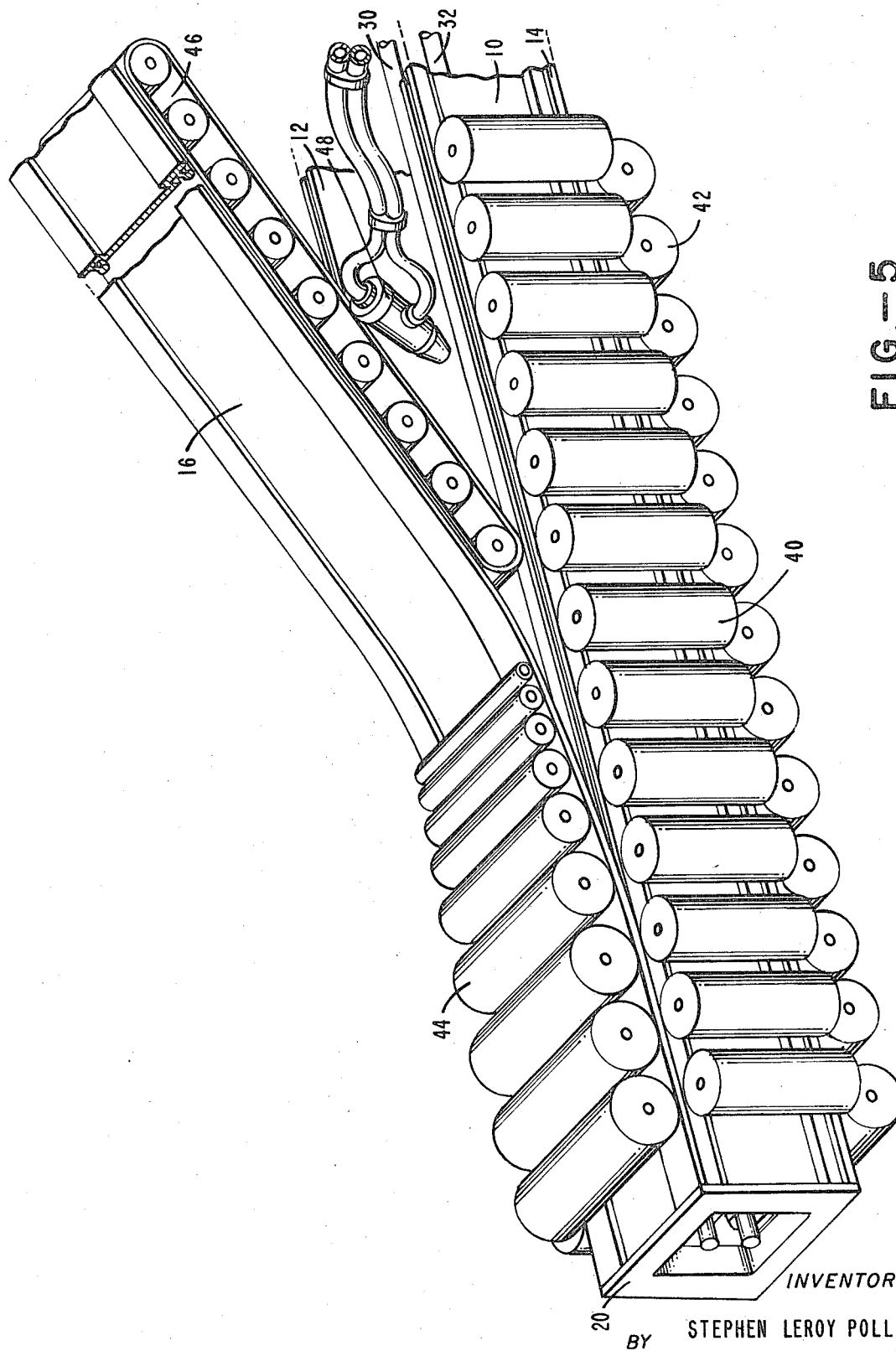
FIG. 5 shows in schematic form the fabrication of the embodiment of FIG. 1.

Turning to the drawings in greater detail, the embodiment particularly illustrated, and which is merely exemplary of the various configurations of this invention, includes side skin sheets 10 and 12, bottom skin sheet 14 and top skin sheet 16. It is understood that these terms refer to the normal orientation during fabrication, and do not relate to the orientation in the use of the structural member. The skin sheets are preferably, although not necessarily joined to each other by tongue and groove interlocks 18. The end caps 20 and 22 are normally metal stampings or castings and are provided with holes or apertures 24 adapted to receive the threaded ends 26 and 28 of the reinforcing members 30 and 32. The tensioning or stressing of the reinforcing members 30 and 32 is accomplished by making up the nuts 34 and 36 on either or at both ends of the structural member. The lightweight void-containing material is shown at 38 and in final condition is adhered and bonded to the inner surfaces of the skin sheets. The material 38 is normally formed in situ by the injection of a liquid foamable mass which infiltrates around the interlocks 18 so that after foaming the interlocks are further secured by a thin film of plastic "glue."

With particular reference to FIG. 5, the structural member of this invention can be formed in a variety of ways. However, I have found that the most effective technique involves the use of a pair of vertical and a pair of horizontal restraining rollers. The vertical rollers 40 are uniform in size and spaced a distance essentially equivalent to the width of the member being formed. The lower horizontal rollers 42 are also of uniform size. The upper horizontal rollers 44 have an axis of rotation parallel to that of rollers 42 but the rollers 44 are graduated in size to provide a tapered forming zone to facilitate the placement of top skin sheet 16 by the feed conveyor 46.

In practice, the skin sheets 10, 12 and 14 are preassembled to form a three-sided trough open at the top. The end caps 20 and 22 and the reinforcing members 30 and 32 are attached to the pre-assembly. This trough is then started into the zone defined by the pair of vertical rollers 40, the lower horizontal rollers 42 and the upper horizontal rollers 44. The top skin sheet is attached at one of its ends to one end of the trough and is continuously fed by the conveyor 46 as the entire assembly is advanced in the zone. As the assembly is advanced in the manner just described, void-forming ingredients, normally in liquid form, are continuously injected by mixer 48.

After the top skin sheet is in place and injection is completed, the entire assembly can be held in the rollers or in some other restraining fixture while the void formation is permitted to become completed. The void formation is usually, but not necessarily assisted by the application of mild heating to the entire assembly, on the order of 100°F to about 175°F for from about 5 to 10 minutes up to 2 to 24 hours, depending on the formulation involved, catalyst level and thickness of the structural member being formed.

The structural member after the void-containing material is in place can be stressed simply by further making up nuts 34 and 36 which places the skins under further compression and which results in the application of compressive stresses to the core. The force distribution in the stressed core is essentially omniversal. The compression of the core also increases its density. The stressing need not be uniform. For example, certain reinforcing members can be adjusted to compress one portion of the core while leaving another portion in proximity to another reinforcing member essentially unstressed. Hence, it can be seen that the structural member of this invention is adapted to the pre-stressing of the core to meet the exact requirements of any given application. It is believed that the ability to tailor pre-stressing in a structural member is unique, and it is anticipated that this concept, which is the essence of this invention, will be widely adopted in the art.

The present invention is not limited to the use of aluminum skin sheets, although such are preferred for reasons of lightweight and economy. The skin sheets may be metal or thin essentially rigid plastic sheet, or even wood or cardboard.

The end caps are usually aluminum casts, although other materials and forming procedures are obviously applicable.

The invention is applicable to virtually any length, shape, or cross-section of structural member. The members can be fabricated on-site with a minimum of fixed fabrication equipment. Longer members can be formed by connecting together several individual sections. Members can also be shortened by cutting, and replacing the end cap.

The reinforcing members are usually aluminum or steel wires or cables.

The void-containing material is preferably a plastic foam such as rigid polyurethane because of its excellent bonding characteristics to metal. The polyurethane foams are generally based on hydroxy-terminated polyethers, polyesters and the like which are reactive with polyfunctional organic isocyanates. The foam-forming formulations also generally contain foam-formers such as water or Freon. Various catalysts such as the metal salts of organic monocarboxylic acids and organo-metallic compounds are ofttimes employed to accelerate the formation of the foam. Other foam-forming systems such as those based on polystyrene, polypropylene, etc. are known to those skilled in the art, and are fully applicable to the practice of my invention. Void-containing materials based on starch are also available. I particularly prefer foam containing a flame retardant such as a highly halogenated material containing fluorine or chlorine since foams based on such materials will meet or exceed the existing building code requirements. The chlorinated or fluorinated material may be in the form of an additive such as polyvinylidene fluoride, and/or may be introduced as part of the polymer-former such as by the use of tetrachloro-p-phenylene diisocyanate in the urethane formulation. Other flame inhibiting additives such as antimony trioxide may also be utilized.

Having fully described the invention, it is intended that it be limited only by the lawful scope of the appended claims.

I claim:

1. A novel elongated stressed structural member which comprises an elongated beam having four lateral sides and formed of a composite of a lightweight plastic organic polymer resin foam core to which is bonded on all four lateral sides generally flat, thin metal skin sheets, said foam core having one or more longitudinally disposed reinforcing wires or cables embedded therein, and end cap members at each end of said beam, said end cap member having holes therein in which the ends of said reinforcing wires or cables are received, said wires or cables being under tension and acting, in conjunction with said end caps, to maintain said foam core under longitudinal compressive force.

2. The member of claim 1 in which the skins are aluminum.

3. The member of claim 1 in which the core is rigid polyurethane foam.

4. The member of claim 1 in which the core is a flame retardant material.

* * * * *